United States Patent

[11] 3,580,540

| | | |
|---|---|---|
| [72] | Inventor | Irving Joseph Heinen<br>3758 Parkview Drive, Lakewood, Calif. 90712 |
| [21] | Appl. No. | 764,743 |
| [22] | Filed | Oct. 3, 1968 |
| [45] | Patented | May 25, 1971 |

[54] ROTATABLE MULTIPORT VALVE WITH FLUID PRESSURE CONTROLLED VALVE MEANS
1 Claim, 2 Drawing Figs.

[52] U.S. Cl.................................................. 251/159, 251/172, 137/625.47
[51] Int. Cl...................................................... F16k 5/18
[50] Field of Search........................................... 251/159, 172; 137/625.47

[56] References Cited
UNITED STATES PATENTS

| 3,007,490 | 11/1961 | Passmore | 251/172X |
| 3,013,766 | 12/1961 | Dawson | 251/172X |
| 3,101,752 | 8/1963 | Martin | 251/172X |
| 3,350,055 | 10/1967 | Campbell et al. | 251/159X |

*Primary Examiner*—Alan Cohan
*Assistant Examiner*—Michael O. Sturm
*Attorney*—Whann and McManigal ABSTRACT: A rotatable multiport valve structure which is susceptible of use, for example, in two, three, or four-way, and the like flow control valves, and includes a hollow valve body within which there is rotatably mounted a normally freely rotatable flow control gate means containing flow passages or channels which are selectively positionable in registration with body ports communicating with flow passages having connector members for connection with conduits. Sealing of the registered flow channels or passages at each port is accomplished by means of a fluid pressure actuated ring piston reciprocally motivated to seated and nonseated positions at its inner end with respect to an annular seat carried by the rotatable gate means, and wherein the piston in seated position acts to lockingly retain the gate means against movement.

Patented May 25, 1971  3,580,540

IRVING JOSEPH HEINEN
INVENTOR
WHANN & McMANIGAL
Attorneys for Applicant
BY

ROTATABLE MULTIPORT VALVE WITH FLUID PRESSURE CONTROLLED VALVE MEANS

BACKGROUND OF THE INVENTION

The present invention relates to valve structures.

Heretofore it has been known to utilize in linear actuated gate valves, an annular seal member which could be actuated by a fluid actuating pressure in one direction only into a seated position on the gate, spring means being operable to return the seal member to nonseated position.

It has also been known to utilize a somewhat similar arrangement in a pivoted stop valve, and in other cases to utilize a bellows type metal seal structure.

While the known devices have operated more or less satisfactorily for the particular types of valves as enumerated above, the movable seals as disclosed in such valves have not been readily adaptable for use in two, three, or four-way valves, particularly of larger sizes. The inadequacy of the known sealing arrangement which is positively operable both into and out of engagement with an annular seat carried by the rotatable fluid control means.

Accordingly, the present invention proposes an arrangement which overcomes the inadequacy of the prior structures by providing in a multiport valve, a rotatable fluid control means which carries annular seats which may be brought easily and selectively into registration with valve ports in the valve body. At these points of registration, ring type piston members are positively urgeable into seated positions against the registering seats in order to lock or clamp the fluid control means against movement and seal the fluid flow passages through the valve, and when it is desired to change the flow through the valve the piston sealing members may be actuated positively to a nonseated position which will permit the valve setting to be readily changed.

Summary of the Invention

The present invention relates generally to multiport valves of the rotary gate type, and is primarily concerned with improvements in the sealing means for sealing the valve flow passages at the valve ports for the respective valve settings.

It is one object of the herein described invention to provide sealing means for use in rotating valves of the multiport type which, for example, may embody two, three, or four-way and the like valve structures.

A further object is to provide a multiport valve which may be changed from one setting to another, such valve having improved sealing means which are positively operable at will to sealed and nonsealed positions at the respective settings of the valve.

Another object of the invention is to provide in a multiport valve, improved sealing means which includes a ring piston positively operable by actuating fluid pressure into and out of seated engagement with a valve seat carried by the flow control gate means of the valve.

Still another object is to provide in a valve according to the present invention, sealing piston means which also serves in a seated sealing position to lockingly retain the moveable gate control means against movement.

Further objects and advantages of the invention will be brought up in the following part of the specification, wherein detailed description is for the purpose of fully disclosing a preferred embodiment of the invention without placing limitations thereon.

Brief Description of the Drawings

Referring to the accompanying drawings, which are for illustrative purposes only.

Description of Preferred Embodiment

Figure 1:
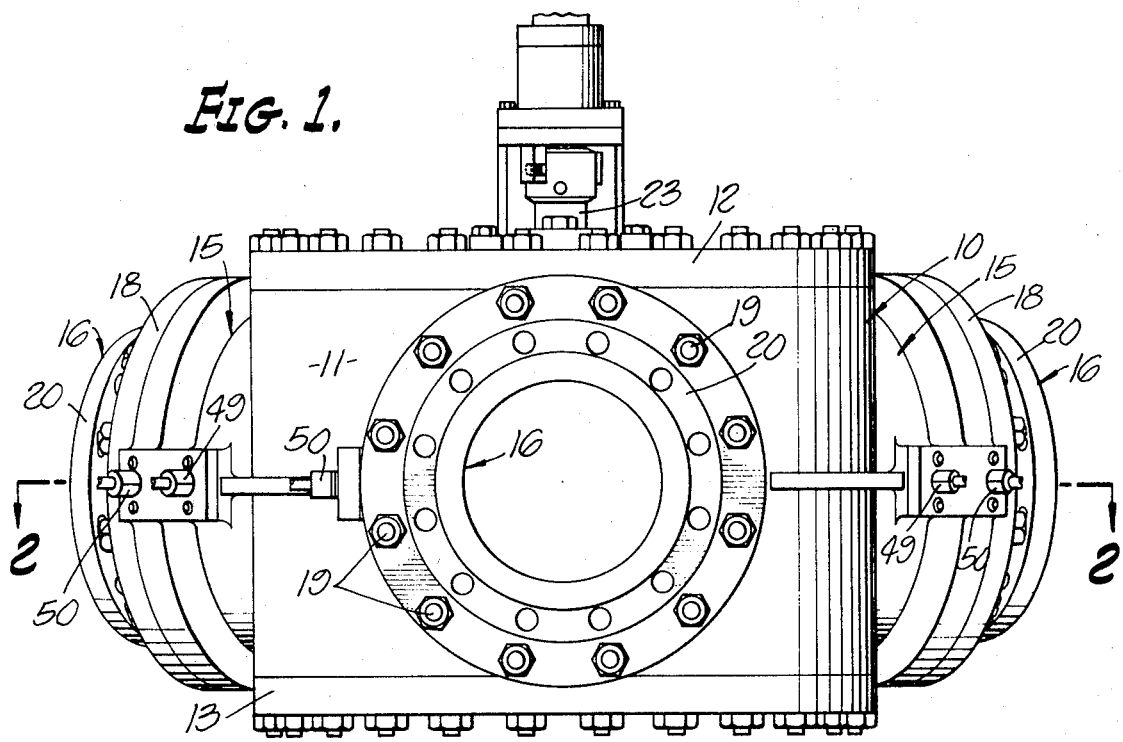
FIG. 1 is a side elevation of a rotatable multiport valve embodying the features of the present invention.
Figure 2:
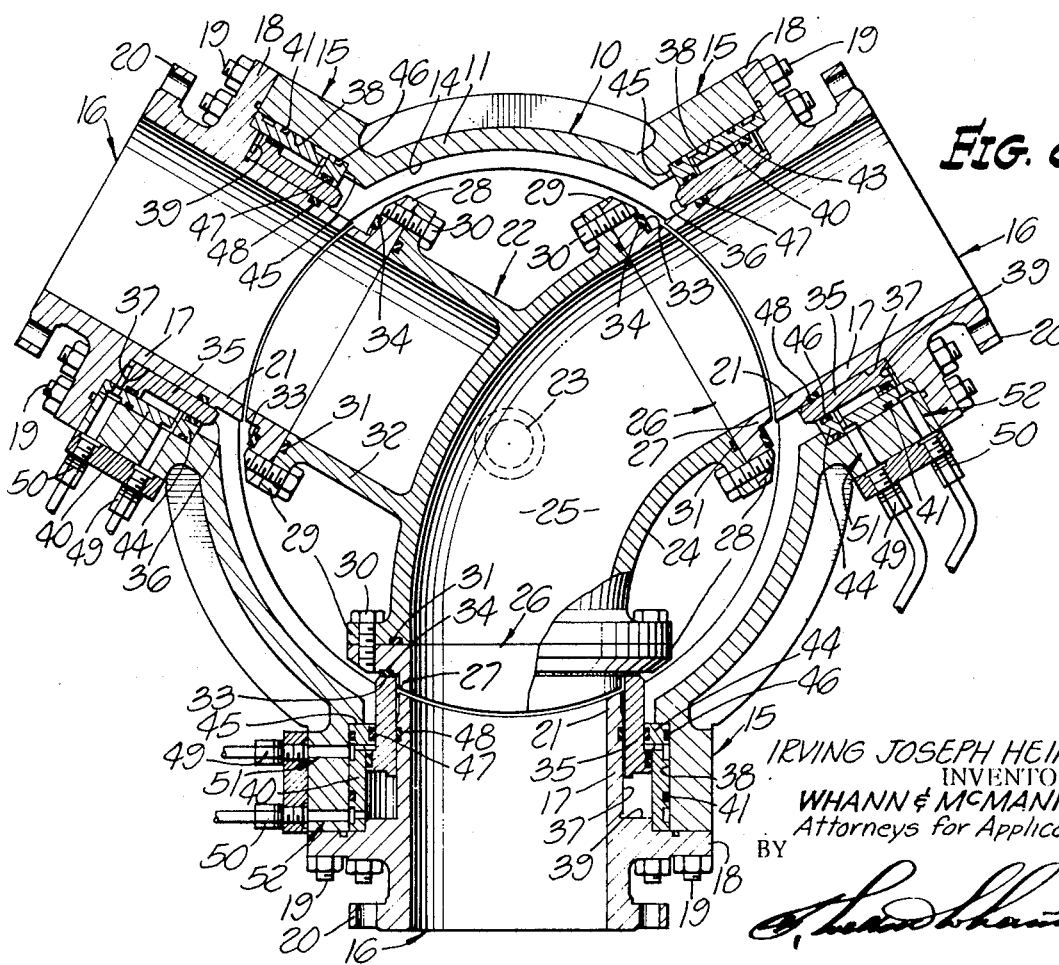
FIG. 2 is a horizontal section taken substantially on line 2-2 of FIG. 1, showing details of construction and cooperative relationship of the various parts.

Referring more specifically to the drawings, for illustrative purposes, the present invention will be described in connection with a three-way valve, but it is to be understood that it is not to be thus limited, since the features are readily adapted for use with a variety of valves of the multiport type in which it may be desired to control the flow of fluids by one or a multiplicity of valve settings.

More specifically, the valve embodying the present invention is disclosed as comprising a generally cylindrical housing or valve body 10 having a surrounding wall structure 11 which cooperates with upper and lower closures 12 and 13 respectively to provide an internal cavity 14 connecting with a plurality of circumferentially spaced outwardly extending radial body neck portions 15 arranged to provide flow connections to the valve.

At each neck portion 15, there is provided a tubular connector member 16 which is formed with a cylindrical wall 17. The tubular member is supported on the neck portion by means of a supporting flange 18 which outwardly surrounds the member and is arranged to be secured in a mounted position at the outer end of the body neck portion as by retaining studs 19. As thus secured, the cylindrical wall is coaxial with the neck portion, the outer end of the wall being provided with a pipe or conduit connection flange 20 which permits appropriate fluid flow connections to be made to the valve. The innermost end of the wall 17, projects into the internal cavity of the valve body past the inner surface of the wall structure 11, so that the inner end provides a communicating port opening 21 for the flow passage defined by the cylindrical wall 17.

Within the valve body housing cavity 14, there is provided a rotatably supported structure 22 for controlling the valve operation settings and determining the fluid flow with respect to the valve ports. The gate structure, of course, may vary as to details of construction depending upon whether the valve is a two, three, or four-way valve. In any event, the gate structure is supported in a conventional manner for rotation as a unit and includes a suitable actuator shaft 23 which is shown as extending through the upper cover plate 12. This shaft is connectable to appropriate means for actuating the gate and may include hydraulic or electric power means with appropriate controls for changing the valve setting from one operating position to another.

In the valve which is illustrated and described herein, the construction provides a three-way valve and as such embodies three neck portions 15 which are operatively associated with the gate structure so as to provide flow between two of the flow passages, while blocking flow in the other flow passage. More specifically, the gate structure includes a curved tubular wall 24 having an internal flow passage 25. At each end of this wall, there is provided a removably mounted extension 26 having a tubular wall portion 27 of a diameter corresponding to that of the adjacent wall 24. This extension is attached to the adjacent end of the wall 24 by means of a connecting flange 28 which is secured to a mating flange 29 at the adjacent end of the wall 24 by means of appropriate bolts 30. The flanges are circumferentially sealed at their engaged faces by conventional seal ring 31. As will be seen, the outer end of the wall portion 27 projects axially beyond its securing flange 28 and is adapted to register with the innermost end of the cylindrical wall 17 so as to connect with the port 21 in an operating position of the valve, the confronting ends of the wall portion 27 and the wall 17 being suitably conformed to provide an end-to-end connection yet permit relative rotation of the gate structure. The other end of the tubular wall 24 is similarly connected with an extension 26 for cooperating with the wall portion 17 of the other port which is to be connected with the flow passage 25.

In the case of the port which is to be cut off, the gate structure is provided with a tubular wall 32 which is connected at its inner end and closed by the wall 24. The wall 32 as thus provided has a radially extending axis and similarly carries at its outer end an extension 26 which is adapted to register with and provide a connection with the port opening of the associated wall portion 17.

The manner of sealing the connections between the respective extensions 26 and the associated inner ends of the walls 17 at the respective port openings will now be described in detail. At each of the extensions 26, there is provided an annular seat 33 of rubber or other suitable compressible material, this seat being mounted in a groove 34 formed in the outer face of the flange 28 so as to provide an outwardly facing radial seating surface surrounding the projecting end of the wall portion 27 of the extension 26. This seat is operably associated with a reciprocally mounted piston 35 positioned within the associated neck portion 15 for reciprocal movement to place its innermost end 36 in seated and nonseated relation with the seat 33.

Since the piston 35 at each neck portion is similarly mounted and constructed, it is believed that it will be necessary to describe only the structure as contained within one of the neck portions in order to provide a clear understanding of the arrangement. The cylindrical wall 17 of the tubular connector member 16 is formed with an outer surface 37 which cooperates with an inner circumferentially extending surface 38 of the neck portion to provide an annular cavity 39 for the piston 35 and an associated cylinder formed by a sleeve 40. The sleeve 40 is ring-shaped and is sealed between its ends with respect to the inner surface 38 of the neck portion by a circumferentially extending O-ring 41. The piston 35, it will be observed, is also ring-shaped and has its inner surface in sliding engagement with the outer surface 37 of the cylindrical wall 17, and at its outmost end is provided with an outwardly extending end flange which is sealed with reference to the adjacent inner wall surface of the sleeve 40 by a peripheral circumferentially extending O-ring 43. The sleeve 40 at its outermost end has abutting engagement with the supporting flange 18, and at its innermost end engages a spacer ring 44 which bears against an annular shoulder 45 at the inner edge of the inner wall surface 38. The spacer ring also surrounds the inner end portion of the piston 35, the ring being sealed on its outer periphery with respect to the surface 38 by an O-ring 46 and along its inner periphery with respect to the piston end portion by an O-ring 47. The inner end portion of the piston 35 is sealed with respect to the surface 37 of the cylindrical wall 17 by O-ring seal 48.

For positively actuating the piston 35 into seated and nonseated positions with respect to the seat 33 at each port, connections 49 and 50, which are selectively connectable with an actuator fluid pressure supply source, are provided at the respective neck portions, these connections being in communication with a series of passages 51 and 52 leading to opposite sides of the end flange 42 of the piston. As thus arranged, the piston may be positively actuated into an extended position in engagement with the seat 33 or a retracted position out of engagement with respect to the seat 33. It will be apparent that with the described arrangement, the end-to-end joint between the ends of the wall portion 27 and wall 17 at each port will be effectively sealed when the piston 35 is in extended seated position against the seat 33. Also, it will be clear that when the piston is retracted, the gate structure may be readily rotated to a selected changed valve setting, at which point the pistons 35 at the respective valve ports may be actuated into sealing seated positions with the associated seats 33 to seal and clamp the gate structure against movement from the changed position of the valve setting.

From the foregoing description and drawings, it is believed that it will be clearly evident that the delineated objects and features of the invention will be accomplished.

Various modifications may suggest themselves to those skilled in the art without departing from the spirit of my invention, and, hence, I did not wish to be restricted to the specific forms shown or uses mentioned, except to the extent indicated in the appended claims.

I claim:
1. A multiport valve, comprising:
 a. a hollow valve body having inlet and outlet ports therein, and at each port a cylindrical radially outwardly projecting neck portion;
 b. movable flow control means in said body including an annular seat movable into and out of axial alignment with said ports;
 c. fluid cylinder means surrounding each of said ports;
 d. a fluid pressure actuated ring piston in each cylinder means selectively urged into and out of sealed engagement with said axially aligned seat;
 e. a tubular connector member supported on said neck portion and having a cylindrical wall inwardly spaced within the neck portion and extending into said housing to provide a flow passage connection to the port, said wall and neck portion cooperating to provide an annular cavity for the cylinder means and associated ring piston at said port;
 f. an annular member in said cavity surrounding an inner end portion of said piston;
 g. an outer circumferential seal between said annular member and an adjacent inner wall surface of said body neck portion;
 h. an inner circumferential seal between said annular member and said piston inner end portion; and
 i. a circumferential seal between said piston inner end portion and said cylindrical wall.